INVENTORS.
WOLFGANG SUNDERMEYER
WOLFGANG VERBEEK

INVENTORS
WOLFGANG SUNDERMEYER
WOLFGANG VERBEEK

ATTORNEYS though other arrangements are also possible. In view of the molten salt or salt mixture, and of the possibility to use the acceptor metal in alloy form, simple technical alloys and also technical salts may be used for the inventive purpose.

United States Patent Office 3,480,654
Patented Nov. 25, 1969

3,480,654
PROCESS FOR PREPARING ORGANO-TIN, -BORON, -ALUMINUM, -SILICON, -PHOSPHOROUS, -ZINC AND -MERCURY COMPOUNDS
Wolfgang Sundermeyer, Gottingen, and Wolfgang Verbeek, Hamburg-Volksdorf, Germany, assignors to Th. Goldschmidt A.G., Essen, Germany
Filed Mar. 11, 1966, Ser. No. 533,606
Claims priority, application Germany, Mar. 12, 1965,
S 95,928
Int. Cl. C07f 7/22, 5/00, 3/06
U.S. Cl. 260—429.7
9 Claims

ABSTRACT OF THE DISCLOSURE

Process of preparing the methyl, aryl and aralkyl compounds of the elements of Groups III–A, IV–A, V–A and II–B of the Periodic System. The halides of these elements are reacted with the respective methyl, aryl or aralkyl halides in the presence of a halogen acceptor metal. In accordance with the inventive process, the reaction is carried out in a melt of a non-oxidizing salt or salt mixture.

---

This invention generally relates to metallo-organic compounds and is particularly directed to a novel, improved process for the preparation of organic compounds of the elements of Groups III–A, IV–A, V–A and II–B of the Periodic System, by reacting the halides of these elements with the halides of the organic groups whose respective metal compound is to be formed, in the presence of a metal as a halogen acceptor. The invention is also concerned with preferred apparatus for carrying out the inventive process. The inventive process is particularly suitable for the preparation of organic compounds of the elements boron, aluminum, silicon, tin, phosphorus, zinc and mercury which belong to the indicated groups of the Periodic System.

It has previously been proposed to prepare metallo-organic compounds by the well-known Wurtz synthesis or reaction. Briefly, according to the Wurtz synthesis, an alkyl or aryl halide is reacted with the respective metal halide in the presence of sodium or lithium in a suspension agent of relatively high boiling point. Organic silicon and tin compounds have particularly advantageously been prepared according to the Wurtz reaction. However, in carrying out the Wurtz synthesis, it cannot be avoided that always two alkyl or aryl halide molecules simultaneously react to form higher hydrocarbons or that the metal halides are reduced to the metallic state.

It has also been proposed to use aluminum at very high temperatures for the splitting off of the halogen from the starting substances, which are passed over the aluminum in vapor form. This process has predominantly been employed for the further methylation of methyl chlorosilanes. However, since the thermal stability of organic metal compounds is very limited indeed and the aluminum chloride, which is formed in the reaction causes difficulties in carrying out the process—such as for example by clogging the apparatus, or reaction of the aluminum chloride with the silicon alkyls under formation of aluminum alkyls—this latter process has not been successfully employed and has no industrial importance.

So-called "direct syntheses" are also known for the indicated purposes. These direct syntheses have no immediate bearing on the inventive concept since the only similarity resides in respect to the end product to be obtained, to wit, the metallo-organic compound, and the employment of organic halides for carrying out the reaction. However, these known direct syntheses are briefly discussed because they will later on be compared with the inventive procedure. According to these known direct syntheses for the preparation of metallo-organic compounds, the reaction of the alkyl or aryl halide is not carried out with the metal halide but with the metal proper and in doing so, the metal forms an organic metal compound and also acts at the same time as halogen acceptor. This type of synthesis has several disadvantages, because a plurality of products are formed which are difficult to separate and isolate from each other. A well-known example for a direct synthesis is the Rochow synthesis for the preparation of organochlorosilanes. An important disadvantage of the Rochow synthesis are the stringent requirements with regard to purity, the nature of technical pretreatment required and the exact dosage of the small quantities of the alloying partners of the silicon and also of the catalytic copper. By contrast, the metal halides to be used in accordance with the inventive process may be prepared in simple manner from technical pre-alloys as, for example, ferrosilicon or from oxides, such as boron trioxide. These pre-alloys to be used in accordance with the invention may be easily purified according to known methods and no particular requirements with regard to purity and the like have to be fulfilled.

An intermediate position between the Wurtz synthesis and direct syntheses is occupied by processes in which alloys of the metal to be converted into the organic compound are employed in the presence of a different metal which acts as the halogen acceptor. Examples for this type of synthesis are the preparation of lead tetra-alkyls (anti-knocking agents) from Pb-Na alloy and of tin-alkyls from Sn-Mg alloy and alkyl halide. Such tin-alkyls are used as fungicides and plasticizers.

The well-known Grignard synthesis is used for technical purposes in exceptional cases only due to the required low boiling solvents and the difficult reaction course. Further, the preparation of organic metal compounds from aluminum trialkyls or aryls is exceedingly difficult from a technical point of view, due to the extreme air and moisture sensitivity of aluminum trialkyls and aryls. It will also be readily apparent that the preparation of aluminum triorganic compounds from aluminum, hydrogen and olefines according to the so-called "Mülheimer Process" could not possibly result in the formation of the methyl and aryl aluminum compounds. Consequently, the preparation of those compounds which are particularly important from a technical point of view, to wit, the methyl and aryl metallo-organic compounds (silicones, tin and phosphorus organic compounds), cannot be effected according to this prior art synthesis.

Accordingly, it is a primary object of the present invention to overcome the disadvantages and drawbacks of the prior art syntheses for the preparation of metallo-organic compounds and to provide a process according to which such compounds may be prepared in a simple and economic manner with a minimum of operational hazards.

Generally, it is an object of this invention to improve on the art of synthesizing metallo-organic compounds of the indicated kind as presently practiced.

It is also an object of the invention to provide apparatus in which the inventive process can be carried out with particular advantage.

Briefly, and in accordance with this invention, methyl, aryl or aralkyl halides are particularly advantageously reacted with metal halides in the presence of metals which serve as halogen acceptors (hereinafter referred to as acceptor metals) by positioning the acceptor metals, which may be in the form of an alloy of several metals, in a melt of a nonoxidizing salt or salt mixture and by carrying out the reaction within this melt. The acceptor metals may be liquid or in solid form and should be suspended within the melt in fine distribution or should be dissolved therein.

It is certainly surprising and could not be expected that the reaction proceeds more effectively and favorably in salt melts than for example in the media provided in the Wurtz synthesis or the like prior art reactions. Applicants do not want to be limited by any theories, but it is possible that the reaction is facilitated by the solubility of the acceptor metal halides in the salt melt. Contrary to the known synthesis, a free metal surface is always available during the reaction until the acceptor metal has been completely consumed. Furthermore, the volume of the salt melt constantly increases during the reaction by additive formation of the acceptor metal halide. By contrast, the media in the reaction of the prior art syntheses are in the final stages of the reaction increasingly converted into a paste-like mass.

Moreover, it is certainly surprising that, contrary to the known reactions, no mixture of products of different alkylation or arylation degree is formed but that essentially exclusively uniform products are obtained.

A further decisive advantage of the inventive process resides in the fact that the original condition of the acceptor metal-salt melt system can be readily restored. In all the known processes for the preparation of metalloorganic compounds, as briefly described hereinabove, the acceptor metal halides which are formed during the reaction can be removed from the system by cumbersome methods only and in most instances they have to be discarded. By contrast, in accordance with the invention, both the salt or salt mixture and also the acceptor metal proper may be readily recovered by carrying out a known electrolysis separation of the melt system. All that is required is that a suitable salt or salt mixture and acceptor metal are chosen. The known high electric conductivity of molten salts at the same time renders possible an optimum utilization of the current to perform chemical work.

Tests have established that several acceptor metals, upon electrolysis, are obtained at the cathode in extremely fine crystalline and highly active form, the latter characteristic being due to the oxide-free surface. This is, of course, of great advantage for the inventive process. Acceptor metals which are recovered in such form are, for example, aluminum obtained from an $AlCl_3/NaCl$ melt or zinc recovered from $ZnCl_2/KCl$ melt. Halogen is simultaneously recovered at the anode of the electrolytic system. The halogen may be re-employed for preparing a fresh quantity of organo-halide to be used in the process or, of course, it may be used for forming the metal halide to be converted into the organic compound. Since, as will be explained in detail further below, predominantly permethylated, perarylated or peraralkylated metal compounds are formed in the inventive process, the entire amount of halogen which has originally been employed is thus recovered. This fact permits the economic use of bromine and iodine, to wit, relatively expensive halogens.

The reaction steps described hereinabove as well as the gross or total equation of the inventive process may be represented by the following Equations A, B and C:

(A) 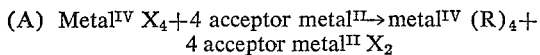

(B) 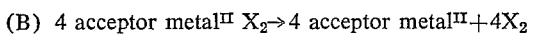

(C) 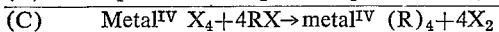

In these equations R stands for methyl, aryl, or aralkyl; and X=halogen.

It will be noted that a quadrivalent metal, such as for example $Si^{IV}$, and a divalent acceptor metal, such as for example $zinc^{II}$, have been chosen as examples.

The following compounds are particularly suitable as reaction components or media for the inventive reaction.

(I) ORGANIC HALIDES

Methyl halides such as chloride, bromide or iodide; aryl halides such as the halides or benzene or naphthalene, as for example chlorobenzene or bromobenzene in which event the benzene nucleus may have suitable other substituents. In choosing suitable starting products, care should, of course, be taken that the respective components are stable under the required reaction conditions; aralkyl halides, such as benzyl chloride or benzyl bromide, phenylethylchloride or higher phenylalkylhalides are also suitable. Also in this case, the organic groups may have additional substituents.

(II) METAL HALIDES

Practically all metal compounds of the metals of the Groups III-A, IV-A, V-A and II-B of the Periodic Systems which have one or more metal-halogen groups are feasible. The fluorides, chlorides, bromides or iodides are suitable as halides. Particular reference, however, is had to the following halides: $BX_3$, $KBF_4$, $AlX_3$, $SiX_4$, $K_2SiF_6$, $SnX_2$, $SnX_4$, $K_2SnX_6$, $PX_3$, $SbX_3$, $ZnX_2$, $HgX_2$.

(X=F, Cl, Br, J.)

Compounds of the enumerated element groups which already contain organic groups may also be used for the inventive reaction. Examples are:

Y=B, Al.

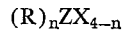

$Z_4$=Si, Sn.

(III) ACCEPTOR METALS

Metals or metal alloys of the I–III main or auxiliary groups of the Periodic System are suitable for most of the reactions contemplated by this invention. The optimum metal or metal mixture for a specific reaction can be readily ascertained by simple tests.

In individual cases, other metals than those identified hereinabove may be sufficient to obtain the desired result (see also Table I below).

In respect to the alkali metals, it is known that they form pure solutions with their molten halides above a predetermined temperature, a fact which is particularly advantageous for the inventive process. The same applies to the alkaline earth metals, while most other metals are present as solids in the form of a suspension. Metals are also known which first react with their halides to form so-called subhalides which, in turn cause the desired halogen splitting.

It is of great advantage if the acceptor metal is capable of forming with the methyl, aryl or aralkyl halides mentioned under (I) above, one or several intermediate compounds which are stable and soluble in the melt. Formation of such organo-metal halides may be expected from the acceptor metals aluminum and magnesium. These organo-metal halides may be capable of forming a complex compound with one of the components of the melt and therefore cannot escape from the reaction vessel and thus are suitable as transfer agents or carriers of the organic group to the metal halide to be converted into the organic compound (see (II)). In addition to aluminum and magnesium, zinc, mercury, tin, lead and antimony many exhibit the same effect under certain conditions.

(IV) SALT MELTS

Generally, all salt melts are suitable as reaction medium which form stable melts up to 500° C. Salts or salt mixtures are preferred which have melting points of up to about 360° C. It is obvious that in choosing the particular salts, it has to be considered that they have to be sufficiently stable under the particular reaction conditions. Since simple or mixed fluorides mostly have a very high melting point, salt melts of chlorides and, in some instances, of bromides or iodides are generally used as reaction medium. It is of particular advantage if the melt, at least in respect to a portion thereof, consists of the same metal halide which is formed during the reaction of the acceptor metal with the halogen of the other reaction component (see (I) and (II)), or if, in the reverse, these reaction participants have the same halogen which is present in the melt. In this manner, the melt, which under certain circumstances may consist of several components (binary, ternary, etc., system) possesses during operation constantly almost the same composition, which latter is only insignificantly changed by the by-products formed during the reaction. Further, in this manner it is possible to start the reaction course with Equation B. With great advantage melts of two or several components in their eutectic composition are used, which results in melts of very low melting point and very low vapor pressure. This is particularly important, because most of the organic metal compounds to be produced are not stable at high temperatures. Further, if several salts are used in the melt, it is recommended that the salts are chosen in regard to their separation potential at the respective temperature, so that upon electrolysis the desired acceptor metal is liberated.

In spite of the multitude of the systems acceptor metal-salt melt which are feasible within the scope of the invention, and irrespective of the different reaction mechanisms which are possible, it is merely necessary for the success of the process that a system acceptor metal/salt melt of the indicated kind is provided. Table I below lists several melts as well as several acceptor metals which may be used in conjunction with the melt. It should be appreciated, however, that the table is given by way of example only since a large number of combination possibilities exists. The table merely lists a few examples of systems which have particularly low melting points and which, corresponding to the separation potential of the acceptor metal halide formed, permit simple re-formation of the acceptor metal by electrolysis and thus render continuous operation possible.

TABLE I

| Melt | Acceptor metal | Condition of acceptor metal | Temperature, °C |
|---|---|---|---|
| NaCl—AlCl$_3$ | Al | Solid | 90 |
| NaCl—AlCl$_3$ | Al/Hg | Liquid | 90 |
| NaCl—AlCl$_3$ | Zn | Solid | 90 |
| NaCl—AlCl$_3$ | Mg | do | 90 |
| NaBr—AlBr$_3$ | Al | do | 200 |
| HgCl$_2$—KCl | Hg | Liquid | 182 |
| ZnCl$_2$—KCl (NaCl) | Zn | Solid | 230 |
| ZnCl$_2$—KCl (NaCl) | Zn/Hg | Liquid | 230 |
| ZnCl$_2$—KCl (NaCl) | Zn/Mg | do | 230 |
| SnCl$_2$—KCl (NaCl) | Sn | do | 231 |
| SnCl$_2$—KCl (NaCl) | Sn/Hg | do | 231 |
| SnCl$_2$—KCl (NaCl) | Sn/Zn | do | 231 |
| LiCl—KCl | Li | do | 352 |
| LiCl—KCl | Li/Sn | do | 352 |
| LiCl—KCl | Li/Pb | do | 352 |
| MgCl$_2$—KCL—CaCl$_2$ | Mg | Solid | 425 |
| RbF—NaF—LiF | Rb | Liquid | 425 |
| CaCl$_2$—NaCl | Na | do | 508 |

The inventive process may be carried out discontinuously, to wit, batch-wise, semi-continuously or fully continuously. In discontinuous operation, acceptor metal is constantly supplied to the melt with the two other reaction participants and the acceptor metal halide formed is removed. The advantage of direct recovery of the acceptor metal by electrolytic methods is absent in the discontinuous process. This is particularly the case if the respective acceptor metal has a higher separation potential than the other components of the salt melt. The semi-continuous process is exceptionally suitable particularly on laboratory scale. Organo-halide and metal halide are introduced into the melt at the same time or successively until the acceptor metal has been completely consumed according to Equation A above. The latter procedure, to wit, successive introduction is applicable if organic compounds of the acceptor metal are formed as a stable intermediate which is soluble in the melt. In some instances, the metal halide which is fed into the reaction system is reduced by the acceptor metal. If this occurs, the inventive process can only be carried out with acceptor metals which are capable of forming stable intermediate compounds which thereafter, in a second reaction step, are reacted with the metal halide. The procedure is then interrupted and about the same amount of the original acceptor metal is recovered by electrolysis (Equation B) whereupon again the procedure is continued pursuant to Equation A. The continuous process (Equations A and B proceed simultaneously) may be carried out in an apparatus consisting of two or three chambers.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Since a preferred apparatus for the discontinuous procedure is substantially identical with the apparatus for the semi-continuous procedure, except for the electrodes which are not required in the discontinuous procedure, no separate showing has been given in respect to discontinuous procedure apparatus.

Figure 1:
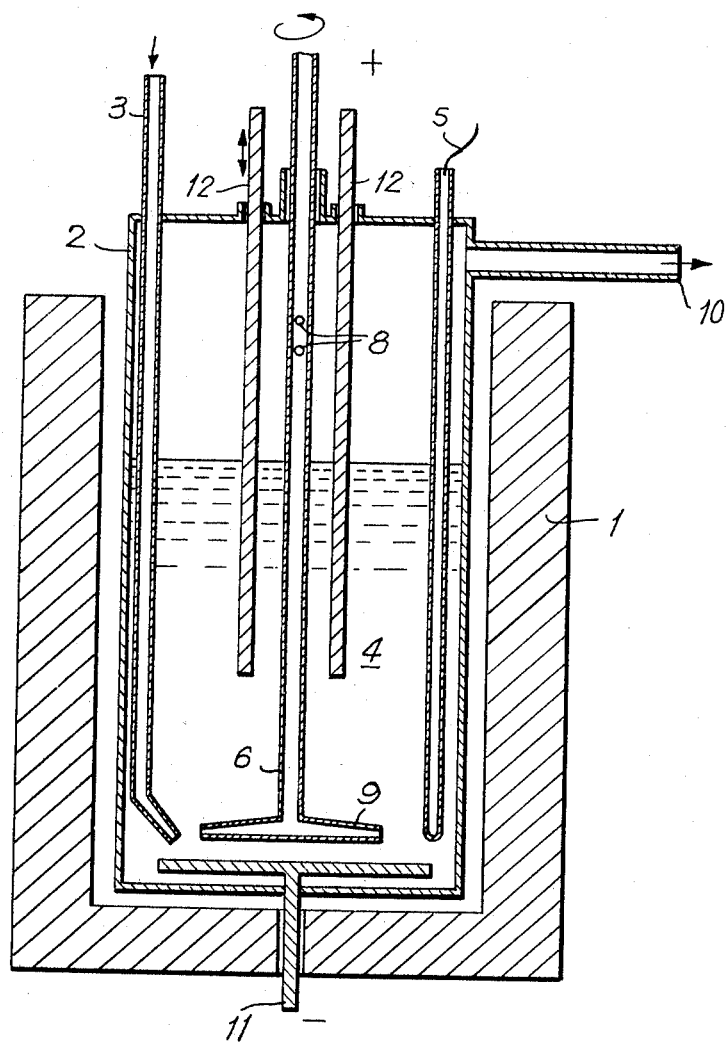
FIG. 1 is a somewhat diagrammatic showing of an apparatus for carrying out the inventive process in a semi-continuous manner.

Referring now to FIG. 1 which pertains to the semi-continuous procedure, it will be noted that a reaction vessel 2 is provided which is accommodated within the space defined by a heatable means 1 such as a furnace. The furnace 1 is heated in any suitable manner, for example by a heating coil or the like resistance heating means (not shown) to maintain the reaction vessel 2 at the required temperature. A supply or inlet tube 3 extends through an opening into the reaction vessel and terminates adjacent the bottom thereof. The reaction vessel 2 holds the acceptor metal-salt melt mixture 4 and the organo-halide and the metal halide are introduced into the melt-acceptor metal system through the inlet pipe 3. The organo halide and the metal halides may previously have been vaporized so that the vapors flow through the pipe in direction of the arrow. Since considerable quantities of heat energy are liberated during the reaction, the temperature within the reaction vessel has to be properly adjusted. For this purpose, the temperature is constantly measured in known manner by means of a thermo element 5 located in the melt, the electric resistance heating means of the furnace 1 being operatively connected with the thermo element and responsive thereto so as to suitably adjust the temperature. The reaction takes place while the organo-halide and the metal halide pass through the melt 4. However, a single passage through the melt is sometimes not sufficient to complete the reaction, and for this reason it is recommended to cause repeated contact between the vapors rising from the melt and the melt proper. For this purpose, an agitating means 6 is preferably provided which causes repeated re-introduction of the rising vapors into the melt before the products exit from the reaction vessel 2 through the discharge pipe 10. This agitating means 6 may be of conventional construction for causing vapor-melt contact and sucks the vapors or gases above the level of the melt through the holes 8 into the hollow shaft of the agitating means and hurls the vapors, due to the centrifugal force caused by the rotation of the agitating means, again into the melt 4 through the open ends of the lateral stirrer arms 9 of the agitating means. The reaction products are received in cooled receiving vessels (not shown) into which the exit pipe 10 discharges.

In the discontinuous process, fresh amounts of acceptor metal may continuously be added, if desired jointly with an additional salt component. By contrast, in the semi-continuous process, the introduction of the two reaction participants in vapor form is interrupted as soon as the acceptor metal has been largely consumed, whereafter the reaction vessel is flushed through the inlet pipe 3 with an inert gas. Thereupon, a direct voltage is applied to the electrodes which are built into the reaction vessel. The electrodes are for example in the form of a steel sheet disk 11 which forms the cathode and a tungsten anode 12. The tungsten anode 12 may either be formed of several circularly arranged rods or of a cylindrical sheet. The applied voltage should be somewhat higher than the decomposition potential of the respective acceptor metal halide at the given temperature which can be readily ascertained and even looked up in handbooks. During the preceding reaction, the liquid level of the melt 4 usually rises. During the electrolysis, however, the level falls back to its original height. For this reason, it is advisable to arrange the anode 12 adjustably in vertical direction. By providing for an adjustable depth of penetration of the anode 12 into the melt, the electrolysis may be carried out constantly at the same current strength per surface unit of the anode. This is important to the extent that it is one of the factors which determines the form in which the acceptor metal separates at the cathode. Generally, the metal is obtained in desired fine crystalline form at a current density of more than 3 amperes/dm.$^2$, provided the metal is obtained in solid form. In this event, the crystals grow frequently in the direction toward the anode A, which can be advantageously prevented by very slow rotation of the agitating means 6, whereby the metal crystals deposit in the form of a fine powder. In another form of the semi-continuous process, a cathode of liquid metal is provided below the melt. The separating acceptor metal dissolves then in the liquid cathode metal under the formation of an alloy. The arms 9 of the agitator 6 are then situated in the liquid metal cathode and during the electrolysis the agitating means is slightly rotated without, however, causing the introduction of the vapors into the melt. When a sufficient amount of acceptor metal has been electrolytically deposited or separated, the reactor is again flushed with inert gas to remove any halogen from the reactor and the production of the organic metal compounds may be resumed in the manner previously described.

Figure 2:
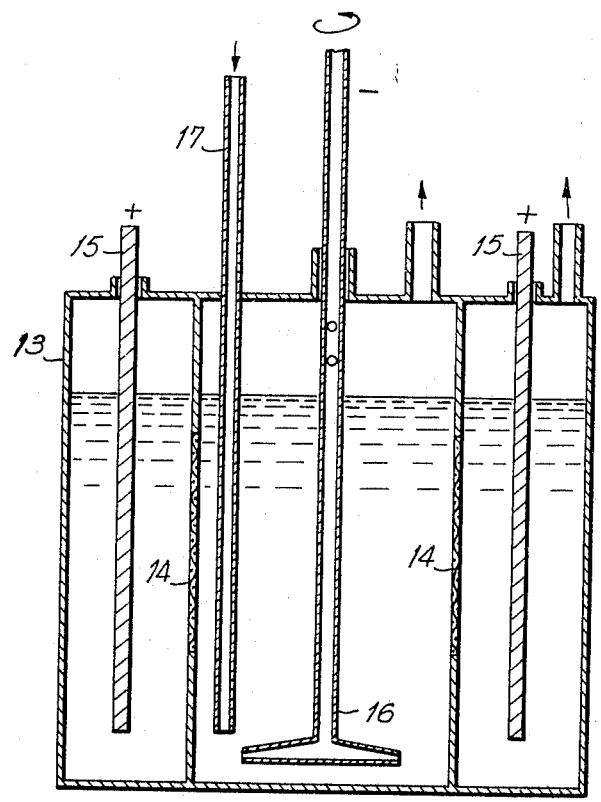
FIG. 2 is an apparatus for performing continuous operation.

Referring now to the continuing process as carried out in an apparatus as shown in FIG. 2, the reaction of the organic halides with the metal halide and electrolysis are performed simultaneously. For this purpose, the superimposed zones for the cathode 11 and the anode 12 have to be separated, for example, in horizontal direction, so that the anodically formed halogen does not come into contact with the reaction participants which are blown into the cathode space. In the event that neither the organo-halide nor the metal halide alone react with the acceptor metal, the electrolytic cell may be very simply constructed as shown in FIG. 2. The reaction vessel 13 is provided with a cylindrical diaphragm 14 which divides the entire reaction space into two zones, to wit, the anode space with the anode 15 and the cathode space with the cathode 16 which latter is at the same time constructed as an agitating means corresponding to the agitating means 6 of FIG. 1. The reaction components in vapor form are blown into the cathode space of the reaction vessel during the electrolysis through the inlet pipe 17. If the electrolysis is carried out with a liquid metal cathode, then the metal can be filled into the lower portion of the cathode space surrounded by the diaphragm 14. The agitating means may then at the same time be used to supply the electric current.

Figure 3:
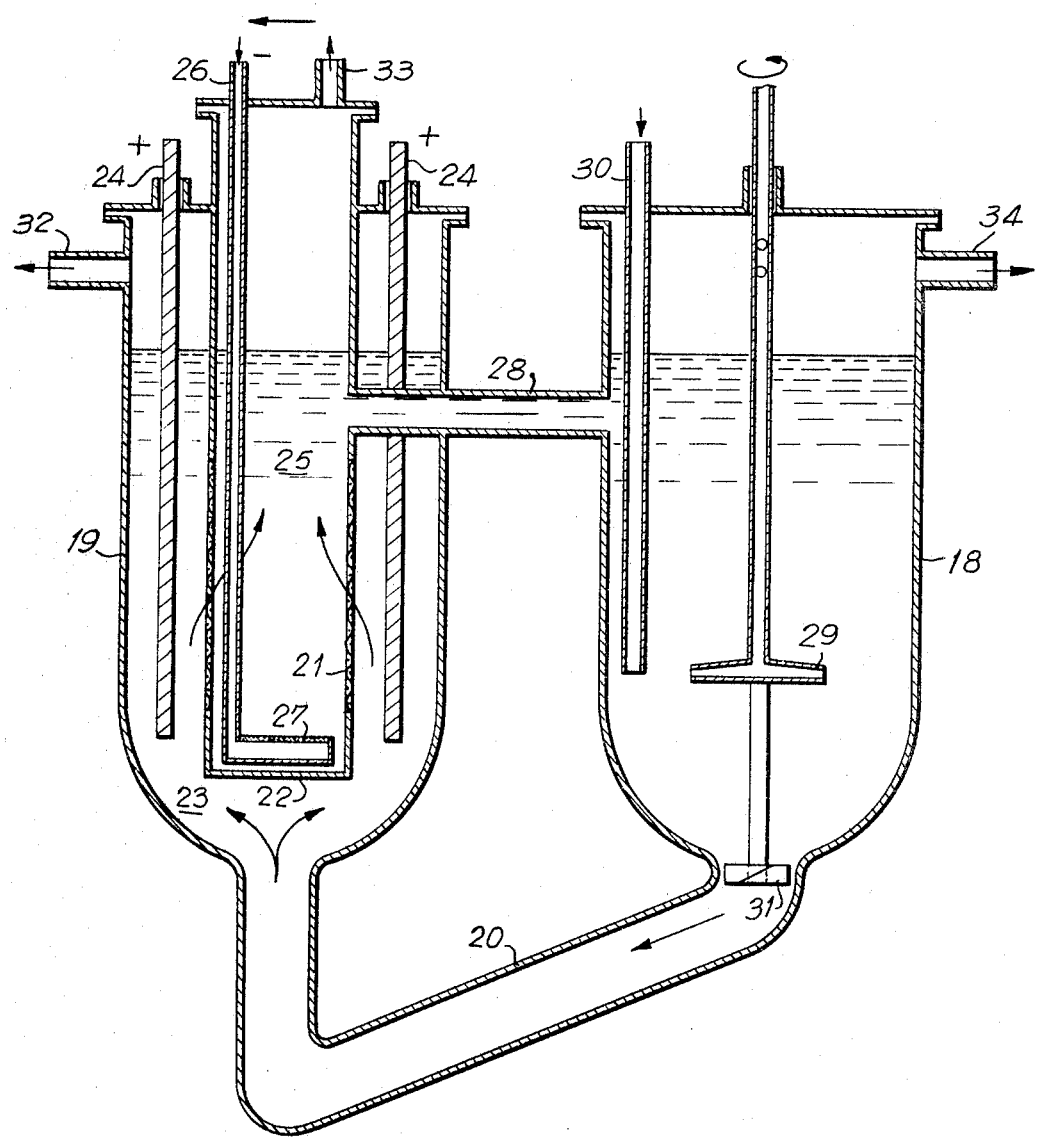
FIG. 3 illustrates an apparatus for continuous operation under intermediate formation of an organo-metal halide.

Referring now to FIG. 3, it should be appreciated that the apparatus diagrammatically shown in this figure is particularly suitable for carrying out the inventive process continuously under intermediate formation of an organo-metal halide.

The apparatus comprises a first reaction vessel 18, shown to the right of the figure, which is connected with a second reaction vessel 19 by means of a tube 20 in communicating manner. A tube 22 is provided which is closed at the bottom and which is laterally constructed in the manner of a diaphragm 21. The tube 22 is inserted into the reaction vessel 19 so that the latter is subdivided into two circular or annular zones, to wit, the anode space 23 containing the anode 24 and the cathode space 25. An inlet pipe 26 of steel, which is outwardly electrically insulated, extends to adjacent the bottom of the tube 22. The pipe 26 terminates in an upwardly directed sieve plate 27 which is sealed in a gas-tight manner in the downward direction. The sieve plate 27 consists of frits of sintered metal and assures a fine distribution of the incoming gases. This sieve plate 27 is at the same time connected as a cathode. Above the diaphragm 21 of the tube 22, however, below the liquid level, a pipe 28 is provided which extends from the cathode space 25 directly into the reaction vessel 18. The reaction vessel 18 is fitted with an agitating means 29 which is essentially of the same construction and has the same function as the agitating means 6 of FIG. 1. Furthermore, an inlet tube 30 extends into the vessel 18. Means have to be provided for causing circulation of the melt in clockwise direction in reference to FIG. 3 here described. This, for example, may be accomplished by providing a propeller stirrer 31 at the lower end of the agitating means 29. Alternatively, a suction stirrer, for example in the nature of a so-called Witt's stirrer, may be built into the apparatus in the lower portion of the reaction vessel 19.

If the apparatus of FIG. 3 is, for example, fed with NaCl-AlCl$_3$ melt (mole ratio 1:1) and the melt is admixed with an additional amount of sodium chloride necessary for binding in complex manner the organo-aluminum chloride subsequently to be formed and if the system is electrolyzed at about 4 volts and 50 amperes, then chlorine separates at the tungsten anode 24. This chlorine is discharged through the discharge pipe 32 and may be used for the preparation of fresh amounts of metal chlorides, for example silicon tetrachloride. The aluminium which is separated at the cathode 27 in finely crystalline form serves as acceptor metal and is reacted with the organo halide which is introduced into the system through the pipe 26 and thus the sinter plate 27, to form the organo-aluminum dihalide. The latter compound, under the formation of the compound NaAlRX dissolves and the solution is supplied to the reaction vessel 18 through the pipe 28. Since the melt is rotated or agitated in the indicated direction, it is assured that no NaAlRX$_3$ enters the anode space 23 through the diaphragm 21 opposite to the flow direction which otherwise would cause electrolytic decomposition of the compounds. The metal halide is supplied to the system through the inlet pipe 30. The metal halide, after having passed several times through the melt, which is effected by means of the agitating means 29, reacts in the reaction vessel 18 to form the desired metallo-organic compound. The aluminum halide (in complex form bound as NaAlX$_4$) which has been formed by splitting off the organo group R and the reception of the halogen atoms of the metal halide, is again supplied through the pipe 20 to the anode space 23. This may be facilitated by the action of the propeller stirrer 31. The process which proceeds in the indicated manner for the production of metallo-organic compounds, has the particular advantage that the organo halide which is required for the reaction in the cathode space 25 may be introduced in excess and after leaving the reactor (through the tube 33) may immediately again be blown into the melt. This means that unreacted product can be constantly circulated through the system. This favors not only the quantitative reaction of the electrolytically formed acceptor metal but primarily the end product which leaves the reaction vessel 18 through the pipe 34, to wit, the desired metallo-organic compound, will be in particularly pure form and is not admixed with unreacted organo-halide. This is in contrast to the prior art processes wherein the metal halide and the organo-halide are introduced simultaneously. In this manner, cumbersome separating operations are thus avoided.

As contrasted to the prior art conventional syntheses, the inventive process permits for the preparation of the metallo-organic compound in exceedingly simple and less dangerous and less expensive manner. Contrary to the direct syntheses as referred to hereinabove, the metal halides which may be obtained from crude pre-products are reacted at considerably lower temperatures to form the corresponding organic compounds. The reaction may be steered and controlled in such a manner that a single end product is formed, for example, permethylated, perarylated or peraralkylated compounds which are produced according to prior art processes with great difficulty only. These compounds may be further converted in known manner to the industrially important organo-metal halides. It should be appreciated that according to the Mülheim process in which aluminum, hydrogen and olefines react to the self-igniting aluminum trialkyls which thereafter may be used as alkylating agents for metal halides, the methyl and aryl compounds of the metals are not directly obtainable. However, these compounds may be prepared in very simple manner in accordance with the inventive process which of course if of particular importance since these compounds are presently the most important metallo-organic derivatives.

The salt melt which is used as solvent or medium, moreover, makes it possible to again convert the acceptor metal halides into acceptor metals by electrolysis while in accordance to the prior art these halides usually had to be discarded. It will also be noted that the recovery of the acceptor metal may be accomplished simultaneously with the reaction proper. The halogen which is formed in this manner may again be used for the preparation of the two reaction participants and thus is not lost. This of course is important from an economic point of view.

The reaction partners are advantageously supplied to the system in gaseous form and the end products are usually withdrawn in gaseous form so that no changes or manipulations are necessary in respect to the reaction vessel during the operation and the reaction thus may proceed without interruption under simultaneous current supply in accordance with the gross Equation C.

The invention will now be described by several examples, it being understood, however, that these examples are given by way of illustration and not by way of limitation and that many changes may be effected without affecting in any way the scope and spirit of the invention as recited in the appended claims. The examples were carried out in equipment corresponding to that shown in the drawings.

Example I 270 grams of aluminum grit (1–2 mm.) are suspended in 2000 grams of a eutectic melt of sodium chloride and aluminum chloride. 180 grams of methyl chloride are introduced into the melt in the course of 5 hours while re-introducing the gaseous products into the melt by means of an agitating means such as the agitating means 6 of FIG. 1. In addition to 28 grams of unconsumed methyl chloride, 325 grams of methylaluminum dichloride $CH_3AlCl_2$ are recovered, which corresponds to a yield of 96% calculated on reacted methyl chloride. Since the substance has a melting point of 73° C., the conduit through which the product is withdrawn has to be heated to at least this temperature.

Example II 1919 grams of an equimolar melt of sodium chloride and aluminum chloride are jointly molten with 292 grams of sodium chloride and admixed with 270 grams of aluminum grit. 374 grams of methyl chloride are introduced into the system under strong agitation and at a temperature of about 200° C. Thereafter, and in the course of 7 hours, 170 grams of methyl trichlorosilane $CH_3SiCl_3$ are reacted with the melt. In addition to 16 grams of methyl trichlorosilane, 91 grams of tetramethylsilane $(CH_3)_4Si$ having a boiling point of 26° C. are obtained. The yield is quantitative, calculated on consumed methyl trichlorosilane.

Example III 3000 grams of an equimolar melt of sodium chloride and aluminum chloride are electrolyzed at about 220° C. for 12 hours (368.2 ampere hours). 123.5 grams of aluminum in the form of fine silverwhite flakes and 447 grams of chlorine separate, which corresponds to a current yield of 92% (calculated on chlorine). 350 grams of methyl chloride are introduced into the system within 4 hours. The freshly electrolyzed aluminum reacts with a strongly exothermic reaction substantially more rapidly than aluminum added in the form of grits.

240 grams of silicon tetrachloride in vapor form are passed through the melt in the course of 8 hours. 58 grams of silicon tetrachloride are recovered which corresponds to a conversion rate or yield of 75.6%. 94.5 grams of tetramethylsilane are produced with quantitative yield.

Example IV

In a melt prepared according to Example III, first paragraph, 220 grams of tin tetrachloride, $SnCl_4$, are introduced in the course of 5 hours at 200° C. Complete reaction takes place and 142.6 grams of tetramethyl tin $(CH_3)_4Sn$ (boiling point 78° C.) are obtained which corresponds to a yield of 95%.

Example V 138 grams of boron trichloride $BCl_3$ are introduced into a melt at about 150° C., the melt corresponding to the composition described in Example III, first paragraph. 65 grams of boron trimethyl $(CH_3)_3B$ are obtained which corresponds to a quantitative conversion and a yield of 99%.

Example VI

Within the course of 4 hours and at 150° C., 420 grams of a mixture of zinc chloride and potassium chloride are added to the melt of Example III, first paragraph. The equimolar mixture of zinc chloride and potassium chloride had been specially dehydrated to make it meltable and had later on been powderized. After a total period of 8 hours, 145.8 grams of zinc dimethyl $(CH_3)_2Zn$ could be separated (yield 76.5%).

Example VII

Half a batch of the melt described in Example III, first paragraph, was prepared. Within the course of 3 hours, 210 grams of well-dried mercury-II-chloride $HgCl_2$ were added to the melt. After further 3 hours, 164 grams of dimethylmercury $(CH_3)_2Hg$ could be isolated. As in Examples IV through VI, care has to be taken that no metallic aluminum is still present in the melt since otherwise the added metal halide, in the present instance the $HgCl_2$, would be reduced to the metallic state.

Example VIII

A melt as described in Example III, first paragraph, however containing an equimolar mixture of potassium chloride and aluminum chloride was prepared. 130 grams of phosphorus trichloride $PCl_3$ were introduced into the melt at 150° C. within 2 hours. Dimethylchlorophosphine forms quantitatively. This compound forms with the aluminum chloride of the melt the complex $(CH_3)_2PCl \cdot AlCl_3$ or $(CH_3)_2PCl \cdot 2AlCl_3$ which complex remains in solution.

Example IX

An aluminum amalgam melt consisting of 2600 grams of mercury and 300 grams of aluminum is prepared. A layer of a second melt is superimposed on the first melt, the second melt weighing 1500 grams and consisting of equimolar portions of sodium chloride and aluminum chloride. A mixture of 139 grams of methylchloride and 137 grams of methyltrichlorosilane in vapor form is introduced into the melt system at 220° C. in the course of 8 hours under operation of an agitating means for reintroducing the vapor components into the melt system. Tetramethylsilane was obtained with 75% yield. The reaction efficiency, due to difficulties in respect to fine distribution of the vapors in the amalgam, was only 35%.

Example X

A melt prepared according to Example III was used. The methylchloride was replaced by 126 grams of bromobenzene and the introduction was effected at 150° C. The bromobenzene reacts quantitatively under formation of the compound $NaAl(C_6H_5)X_3$ and remains in the melt. Upon introducing into the system, for example, 60 grams of trimethylchlorosilane at 180° C., 7 grams of $C_6H_5Si(CH_3)_3$ (yield 14%) are obtained in addition to 25 grams of unconsumed trimethylchlorosilane. Diphenyl is also formed.

Example XI 97 grams of magnesium grit is suspended in 2000 grams of an equimolar melt consisting of sodium chloride and aluminum chloride. The magnesium grit is reacted at 200° C. with 107 grams of chlorobenzene. Within 4 hours, 80 grams of trimethylchlorosilane are subsequently introduced into the system. The fractional distillation of the end products yields 12 grams of tetramethylsilane, 4 grams of trimethylchlorosilane, 28 grams of phenyltrimethylsilane and 13 grams of diphenyl.

Example XII 1500 grams of liquid tin is placed below a melt layer consisting of 924 grams of potassium chloride and 4550 grams of tin-II-chloride, $SnCl_2$. Within 4 hours, 210 grams of methylchloride are blown at 300° C. through an agitating means of the equipment shown in FIG. 1. 62 grams of methylchloride remained unconsumed after the methylchloride had passed through the melt once (70% reaction efficiency). In the reception vessel arranged outside the reactor, 106 grams of $(CH_3)_3SnCl$ are collected (yield: 54.5%, boiling point 163–165° C.). The remainder of the compound maintained in the melt in solution.

Example XIII 3800 grams of liquid tin is placed below a layer of a melt consisting of 822 grams of lithium chloride and 938 grams of potassium chloride. The system is then electrolyzed with the tin cathode and tungsten anodes. The electrolysis is carried out at 400° C. under constant addition of consumed lithium chloride until about 90 grams of lithium are dissolvel in the tin. The current yield was 91.2%. A mixture of 100 grams of methylchloride and 100 grams of methyltrichlorosilane is introduced in vapor form into the system within about 5 hours. In addition to 18 grams of unconsumed methylchloride, 6 grams of tetramethylsilane and 22 grams of trimethylchlorosilane are recovered.

If a mixture of chlorobenzene and trimethylchlorosilane (mole ratio 1:1) is introduced into the liquid lithium-tin-alloy, phenyltrimethylsilane is obtained at 25% yield.

Example XIV 3400 grams of lead are placed below a melt consisting of 1055 grams of lithiumchloride and 938 grams of potassium chloride. Electrolysis is effected at 400° C. with the lead cathode and tungsten anodes until 60 grams of lithium have dissolved in the lead. The current yield is 90%. If a mixture of 100 grams of methylchloride and 100 grams of methyltrichlorosilane is introduced into the system during a period of 6 hours, 7 grams of tetramethylsilane and 31 grams of trimethylchlorosilane are formed.

If chlorobenzene and trimethylchlorosilane in a mole ratio of 1:1 are introduced, phenyltrimethylsilane is obtained at a 28% yield.

Example XV 54 g. (2 moles) of aluminum grit are suspended in 800 grams of an equimolar melt consisting of sodium chloride and aluminumchloride. The system is reacted at 220° C. with 152 grams of methylchloride. Thereafter, within a period of 2 hours and under constant agitation with the agitating means 6. 225 grams of silicontetrachloride are added without, however, continuously removing the end products from the reaction vessel. The pressure increases in this manner to about 30 atmospheres. The experiment is continued for an additional 10 hours, whereafter the reaction products are released. The reaction products consist of about 60% of dimethyldichlorosilane, 10% of trimethylchlorosilane, 10% of methyltrichlorosilane, and 20% of silicontetrachloride. If a larger amount of aluminum and methylchloride is added in respect to the same quantity of silicontetrachloride, more highly methylated products are obtained and the moiety of unreacted silicontetrachloride is reduced. Further, if the reaction period is extended, a larger yield of dimethyldichlorosilane is obtained.

Example XVI 54 grams o faluminum grit are suspended at 200° C. in 500 grams of an equimolar melt of sodium bromide and aluminumbromide and 150 grams of bromobenzene are blown into the system. The bromobenzene reacts under the formation of $NaAl(C_6H_5)Br_3$. If 100 grams of trimethylbromosilane are introduced, 46 grams of trimethylphenylsilane $(CH_3)_3SiC_6H_5$ are formed in addition to unconsumed trimethylbromosilane.

While specific embodiments of the invention have been shown and described in detail to illustrate the application of the invention principles, it will be understood that the invention may be embodied otherwise without departing from such principles.

What is claimed is:

1. In a process of preparing the methyl, aryl or aralkyl compounds of the elements boron, aluminum, silicon, tin, phosphorus, zinc and mercury, wherein the halides of these elements are reacted with the respective methyl, aryl or aralkyl halides in the presence of a metal which serves as a halogen acceptor, the improvement which comprises that the reaction is carried out in a melt of a non-oxidizing halide salt or halide salt mixture which is stable up to a temperature of about 500° C.

2. The improvement as claimed in claim 1, wherein the halide of said element is a salt of the general formula $R_nYX_{3-n}$ or $R_nZX_{4-n'}$, wherein R is alkyl, aryl or aralkyl, Y is boron or aluminum, Z is silicon or tin, X is halogen, $n$ is between 0–2 and $n'$ is between 0–3.

3. The improvement as claimed in claim 1, wherein the melt essentially consists of at least two salts forming a eutecticum.

4. The improvement as claimed in claim 1, wherein a melt is used which at least partly consists of the same halide of the element and the organo-halide with the acceptor metal.

5. The improvement as claimed in claim 1, wherein the melt is a mixture of alkali metal halide and aluminum halide, or a mixture of alkali metal halide and zinc halide or a mixture of alkali metal halide and tin halide or a mixture of lithium halide with other alkali metal halides or alkaline earth metal halides.

6. The improvement as claimed in claim 1, wherein the acceptor metal is Al, Mg, Zn, Sn, Li, or one of the alloys Al/Hg, Zn/Hg, Mg/Zn, Li/Sn, and Li/Pb.

7. The improvement as claimed in claim 1, wherein methylchloride is the organic halide.

8. The improvement as claimed in claim 1, wherein an aryl halide in the form of chlorobenzene or bromobenzene is used.

9. The improvement as claimed in claim 1, wherein an aralkyl halide in the form of benzylchloride is used.

References Cited

UNITED STATES PATENTS

| | | | |
|---|---|---|---|
| 2,403,370 | 7/1946 | Hurd | 260—448.2 |
| 2,598,436 | 5/1952 | Mohler et al. | 260—448.2 |
| 2,759,960 | 8/1956 | Nishikawa et al. | 260—448.2 |
| 2,880,242 | 3/1959 | Hennion | 260—606.5 |
| 2,880,243 | 3/1959 | Hennion | 260—606.5 |
| 2,882,307 | 4/1959 | Copenhaven et al. | 260—543 |
| 2,895,977 | 7/1959 | Fitch | 260—448.2 |
| 2,902,504 | 9/1959 | Nitzsche et al. | 260—448.2 |
| 2,925,439 | 2/1960 | Muetterties | 260—606.5 |
| 3,028,323 | 4/1962 | Kobetz et al. | 260—606.5 X |

TOBIAS E. LEVOW, Primary Examiner

W. F. W. BELLAMY, Assistant Examiner

U.S. Cl. X.R.

204—62, 244, 246; 260—429.9, 431, 433, 448, 448.2, 543, 606.5